US008776362B2

(12) United States Patent
Oshita et al.

(10) Patent No.: US 8,776,362 B2
(45) Date of Patent: Jul. 15, 2014

(54) AUXILIARY FITTING JIG

(71) Applicant: Yazaki Corporation, Tokyo (JP)

(72) Inventors: Osamu Oshita, Toyota (JP); Naoki Kobayashi, Toyota (JP); Akihiro Tsuruta, Fujieda (JP); Toshiya Ishikawa, Fujieda (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 14/024,738

(22) Filed: Sep. 12, 2013

(65) Prior Publication Data

US 2014/0026405 A1 Jan. 30, 2014

Related U.S. Application Data

(63) Continuation of application No. PCT/JP2012/056427, filed on Mar. 13, 2012.

(30) Foreign Application Priority Data

Mar. 16, 2011 (JP) ................................ 2011-058251

(51) Int. Cl.
*B23P 19/00* (2006.01)
*H01R 43/00* (2006.01)

(52) U.S. Cl.
USPC .................... 29/750; 29/747; 29/749; 29/758

(58) Field of Classification Search
USPC ........... 29/750, 517, 747, 749, 758, 760, 874, 29/884; 439/153, 157, 372
See application file for complete search history.

(56) References Cited

U.S. PATENT DOCUMENTS

| | | | | |
|---|---|---|---|---|
| 3,177,567 | A | 4/1965 | Gehrman | |
| 6,183,277 | B1 * | 2/2001 | Okabe et al. | 439/157 |
| 7,976,322 | B2 * | 7/2011 | Matsumura et al. | 439/153 |
| 2009/0203240 | A1 | 8/2009 | Matsumura et al. | |

FOREIGN PATENT DOCUMENTS

| | | | |
|---|---|---|---|
| JP | S52-75793 | A | 6/1977 |
| JP | H5-182739 | A | 7/1993 |
| JP | 2009-187863 | A | 8/2009 |
| JP | 2011-150934 | A | 8/2011 |
| JP | 2011-159574 | A | 8/2011 |
| JP | 2011-258324 | A | 12/2011 |

* cited by examiner

*Primary Examiner* — Thiem Phan

(74) *Attorney, Agent, or Firm* — Marvin A. Motsenbocker; Mots Law, PLLC

(57) ABSTRACT

An auxiliary fitting jig includes first and second jig bodies configured to hold a connector from both sides of the connector, a first interval adjustment mechanism configured to interval-adjustably connect the first and second jig bodies, first and second lever bodies pivotally supported by the first and second jig bodies respectively, a second interval adjustment mechanism configured to interval-adjustably connect the first and second lever bodies in accordance with an interval between the first and second jig bodies adjusted by the first interval adjustment mechanism.

4 Claims, 9 Drawing Sheets

AUXILIARY FITTING JIG

CROSS REFERENCE TO RELATED APPLICATION

This application is a Continuation of PCT Application No. PCT/JP2012/056427, filed on Mar. 13, 2012, and claims the priority of Japanese Patent Application No. 2011-058251, filed on Mar. 16, 2011, the content of both of which is incorporated herein by reference.

BACKGROUND

1. Technical Field

The present invention relates to an auxiliary fitting jig used to fit one connector with another connector.

2. Related Art

Japanese Unexamined Patent Application Publication No. 2009-187863 proposes a lever fitting type connector for fitting another connector into one connector. The lever fitting type connector fits a female connector into a male connector by rotating a lever mounted on the male connector.

SUMMARY

However, if the lever is once rotated to fit the female connector into the male connector in the above relevant lever fitting type connector, there arises a problem that the lever cannot be used to fit other connectors.

In addition, the lever can be used only for male connectors of a specific width and thus, a lever needs to create for male connectors of each different width and many jigs are needed, causing a problem of low versatility.

An object of the present invention is to provide an auxiliary fitting jig of greater versatility capable of fitting connectors of different widths by one auxiliary fitting jig.

An aspect of the present invention is an auxiliary fitting jig used to fit one connector with another connector, the auxiliary fitting jig including a jig body including a first jig body and a second jig body configured to hold the one connector from both sides of the one connector, and a first interval adjustment mechanism configured to interval-adjustably connect the first jig body and the second jig body, and a lever including a first lever body pivotally supported by the first jig body, a second lever body pivotally supported by the second jig body, and a second interval adjustment mechanism configured to interval-adjustably connect the first lever body and the second lever body in accordance with an interval between the first jig body and the second jig body adjusted by the first interval adjustment mechanism. The one connector and the another connector are configured to be fitted by rotation of the lever.

According to the above aspect, the jig body holds a connector from both sides by the first jig body and the second jig body and therefore, after another connector being fitted into one connector, the auxiliary fitting jig can be removed from the connector to be used to fit still another connector.

The jig body includes the first interval adjustment mechanism that interval-adjustably connects the first jig body and the second jig body and thus, connectors having different widths can be held from both sides.

The lever includes the second interval adjustment mechanism that interval-adjustably connects the first lever body and the second lever body in accordance with the interval between the first jig body and the second jig body and thus, connectors having different widths can be fitted into.

Therefore, an auxiliary fitting jig of greater versatility capable of fitting connectors of different widths by one auxiliary fitting jig can be provided.

The second interval adjustment mechanism may be provided in a position where interference by the second interval adjustment mechanism with the jig body is avoided throughout a rotation range of the lever with respect to the jig body.

According to the above configuration, the second interval adjustment mechanism is provided in a position where interference with the jig body can be avoided and therefore, another connector can be fitted into one connector by holding the second interval adjustment mechanism to rotate the lever.

The first interval adjustment mechanism may include a first positioning mechanism configured to position the first jig body relative to the second jig body with an interval between the jig body and the lever being a maximum interval or a minimum interval, and the second interval adjustment mechanism may include a second positioning mechanism configured to position the first lever body relative to the second lever body with the interval between the jig body and the lever being the maximum interval or the minimum interval.

According to the above configuration, the first interval adjustment mechanism includes the first positioning mechanism that positions the first jig body relative to the second jig body and the second interval adjustment mechanism includes the second positioning mechanism that positions the first lever body relative to the second lever body. Therefore, the configuration of each positioning mechanism can be made simpler compared with a case in which the configurations for positioning when the interval is at the maximum and at the minimum are together provided in one of the jig body and the lever.

DETAILED DESCRIPTION

Figure 1A:
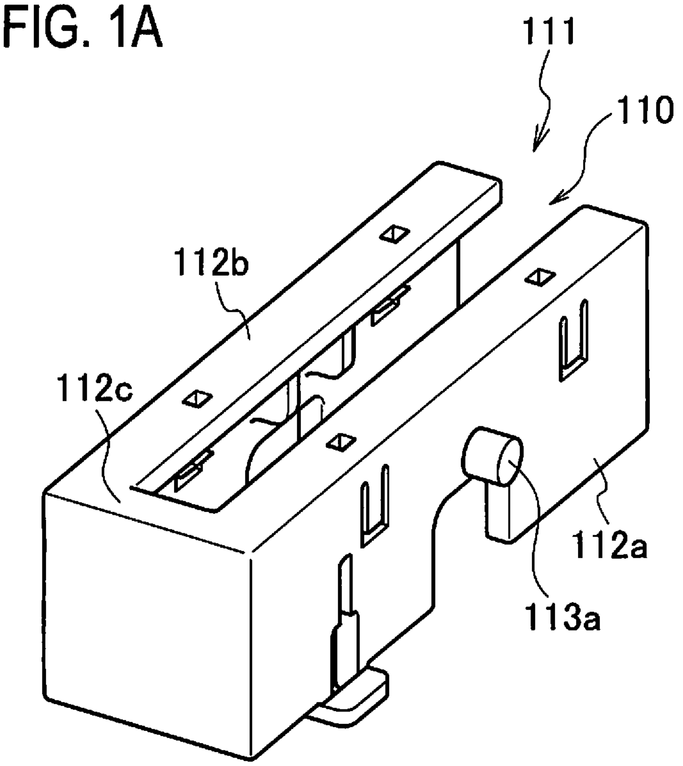
FIG. 1A is a perspective view showing a jig body of an auxiliary fitting jig predicated on the auxiliary fitting jig of the present invention.
Figure 1B:
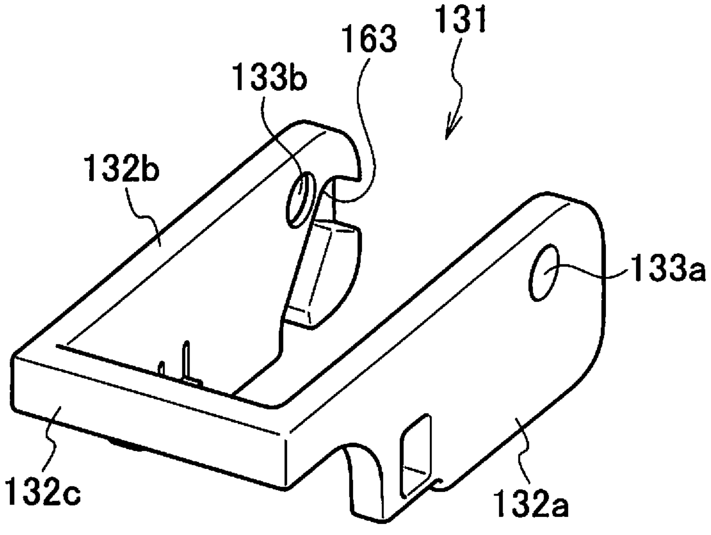
FIG. 1B is a perspective view showing a lever of an auxiliary fitting jig predicated on the auxiliary fitting jig of the present invention.

In the following, an embodiment of the present invention will be described in detail with reference to the drawings. First, the configuration of an auxiliary fitting jig 100 predicated on an auxiliary fitting jig 1 according to an embodiment of the present invention will be described. FIG. 1A is a perspective view showing a jig body 111 of the auxiliary fitting jig 100 predicated on the auxiliary fitting jig 1 according to the embodiment of the present invention. FIG. 1B is a perspective view showing a lever 131 of the auxiliary fitting jig 100 predicated on the auxiliary fitting jig 1 according to the embodiment of the present invention.

Figure 2A:
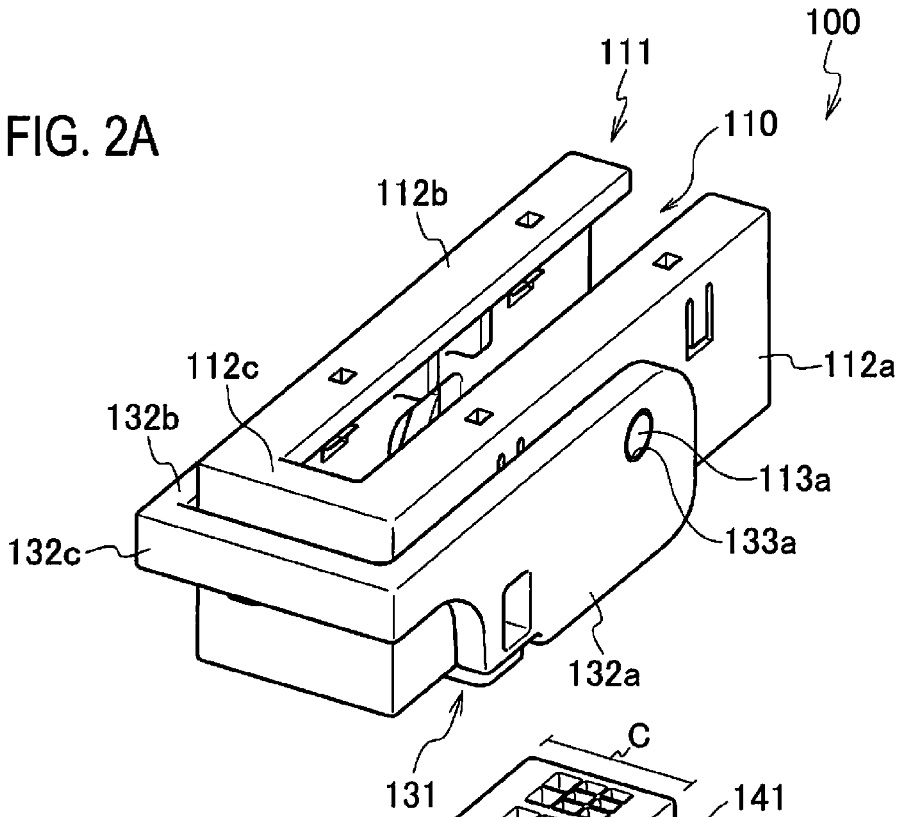
FIG. 2A is a perspective view showing the auxiliary fitting jig predicated on the auxiliary fitting jig of the present invention.
Figure 2B:
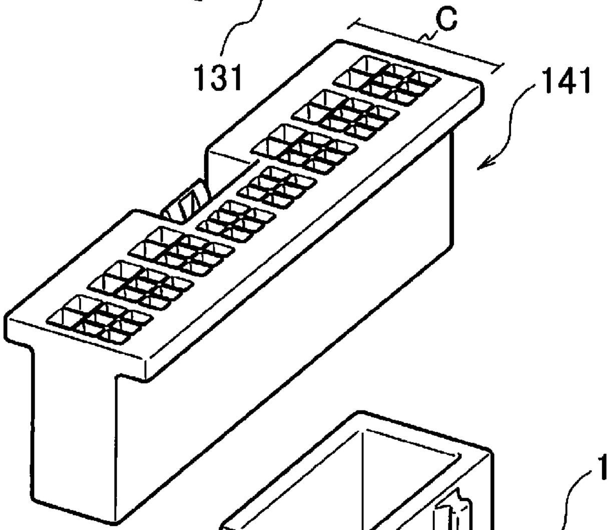
FIG. 2B is a perspective view showing a female connector predicated on the auxiliary fitting jig of the present invention.
Figure 2C:
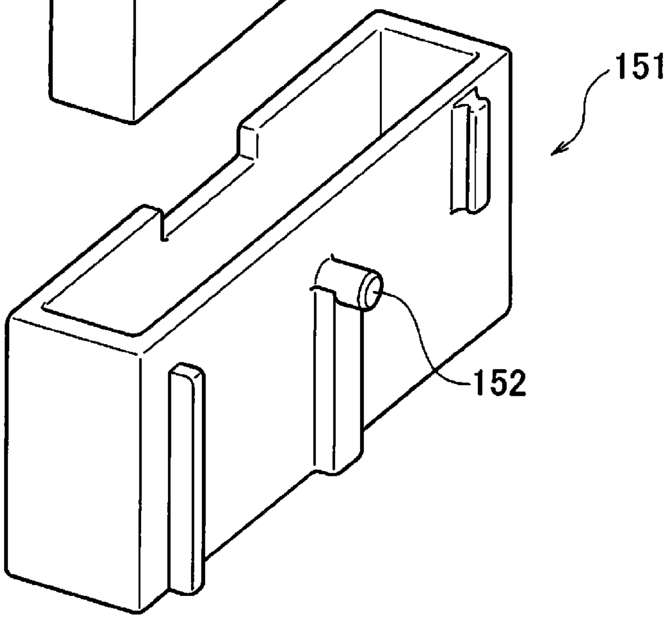
FIG. 2C is a perspective view showing a male connector predicated on the auxiliary fitting jig of the present invention.

FIG. 2A shows a perspective view showing the auxiliary fitting jig 100 predicated on the auxiliary fitting jig 1 according to the embodiment of the present invention. FIGS. 2B and 2C are perspective views showing a female connector 141 and a male connector 151 fitted by using the auxiliary fitting jig 100 predicated on the auxiliary fitting jig 1 according to the embodiment of the present invention.

The auxiliary fitting jig 100 predicated on the auxiliary fitting jig 1 according to the embodiment of the present invention is a jig used to fit the male connector 151 into the female connector 141 by rotating the lever 131.

As illustrated in FIGS. 1 and 2, the auxiliary fitting jig 100 predicated on the auxiliary fitting jig 1 according to the embodiment of the present invention is substantially configured by the jig body 111 including a connector accommodation chamber 110 accommodating the female connector 141 and the lever 131 pivotally supported by the jig body 111 so as to be rotatable.

As illustrated in FIG. 1A, the jig body 111 includes a first jig body 112*a* and a second jig body 112*b* that hold the female connector 141 (see FIG. 2B) from both sides and a jig body connection portion 112*c* connecting the first jig body 112*a* and the second jig body 112*b*.

As illustrated in FIG. 1A, the first jig body 112*a* and the second jig body 112*b* are provided with a pair of lever mounting bosses 113*a*, 113*b* (see FIG. 8 described later) that pivotally supports the lever 131 so as to be rotatable by being inserted into jig assembly holes 133*a*, 133*b* (see FIG. 1B), respectively.

As illustrated in FIG. 1B, the lever 131 includes a first lever body 132*a* pivotally supported by the first jig body 112*a* so as to be rotatable, a second lever body 132*b* pivotally supported by the second jig body 112*b* so as to be rotatable, and a lever body connecting portion 132*c* that connects the first lever body 132*a* and the second lever body 132*b*.

In the first lever body 132*a* and the second lever body 132*b*, a pair of the jig assembly holes 133*a*, 133*b* into which the lever mounting bosses 113*a*, 113*b* (see FIG. 1A or FIG. 8 described later) are inserted is formed respectively.

In the first lever body 132*a* and the second lever body 132*b*, a pair of male connector engagement portions 163 (see FIG. 3 described later) engaged with a pair of male connector projections 152 (see FIG. 2C, one side omitted) projected to the outside of the male connector 151 is formed.

The male connector engagement portion 163 includes one side 163*a* and another side 163*c* opened on two end faces of the first lever body 132*a* and the second lever body 132*b*. The one side 163*a* and the other side 163*c* are connected by an intermediate portion 163*b* whose interval to the jig assembly holes 133*a*, 133*b* becomes gradually shorter (see FIGS. 3 to 5).

As illustrated in FIG. 2A, the lever 131 is pivotally supported by the jig body 111 so as to be rotatable by the lever mounting bosses 113*a*, 113*b* (see FIG. 1A or FIG. 3 described later) being inserted into the jig assembly holes 133*a*, 133*b* (see FIG. 1B), respectively.

The auxiliary fitting jig 100 in which the lever 131 is mounted on the jig body 111 accommodates the female connector 141 (see FIG. 2B) in the connector accommodation chamber 110 before inserting the female connector 141 into the male connector 151. Then, the male connector 151 is fitted into the female connector 141 by rotating the lever 131.

Figure 3:
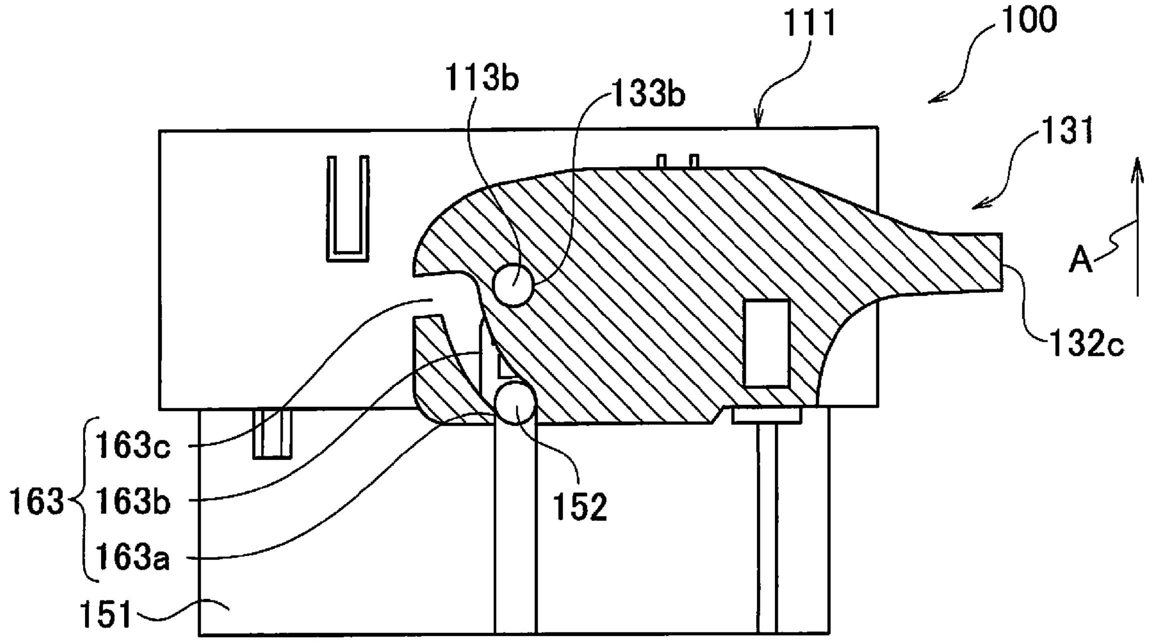
FIG. 3 is a sectional view illustrating fitting work of the auxiliary fitting jig predicated on the auxiliary fitting jig of the present invention.
Figure 4:
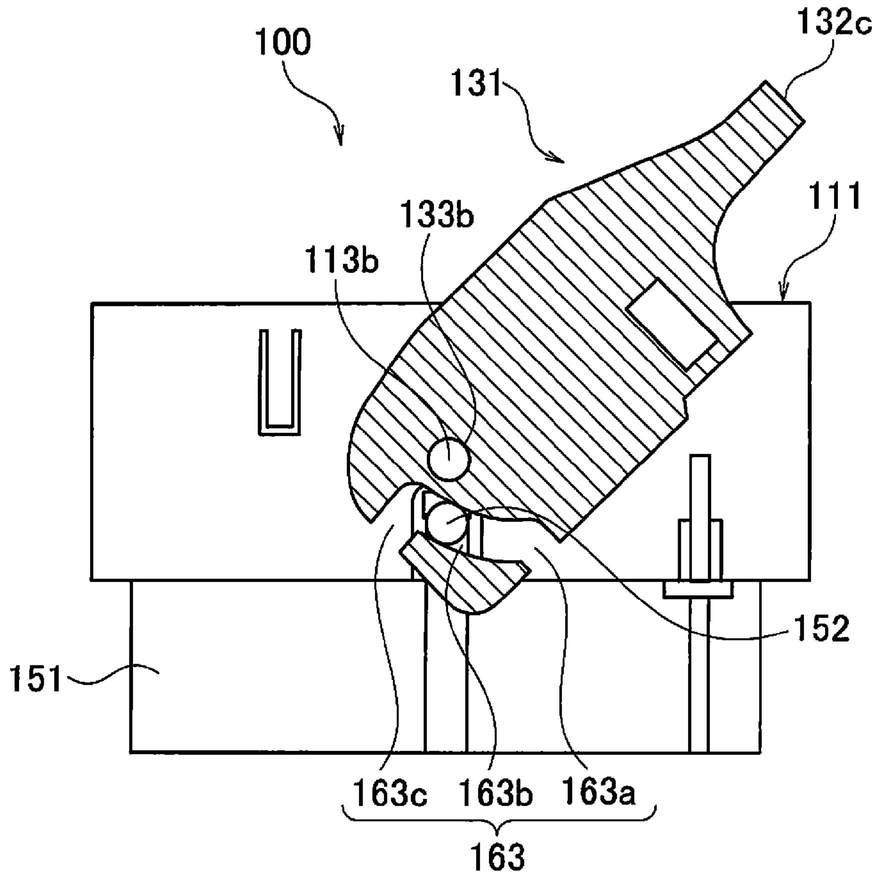
FIG. 4 is a sectional view illustrating the fitting work of the auxiliary fitting jig predicated on the auxiliary fitting jig of the present invention.
Figure 5:
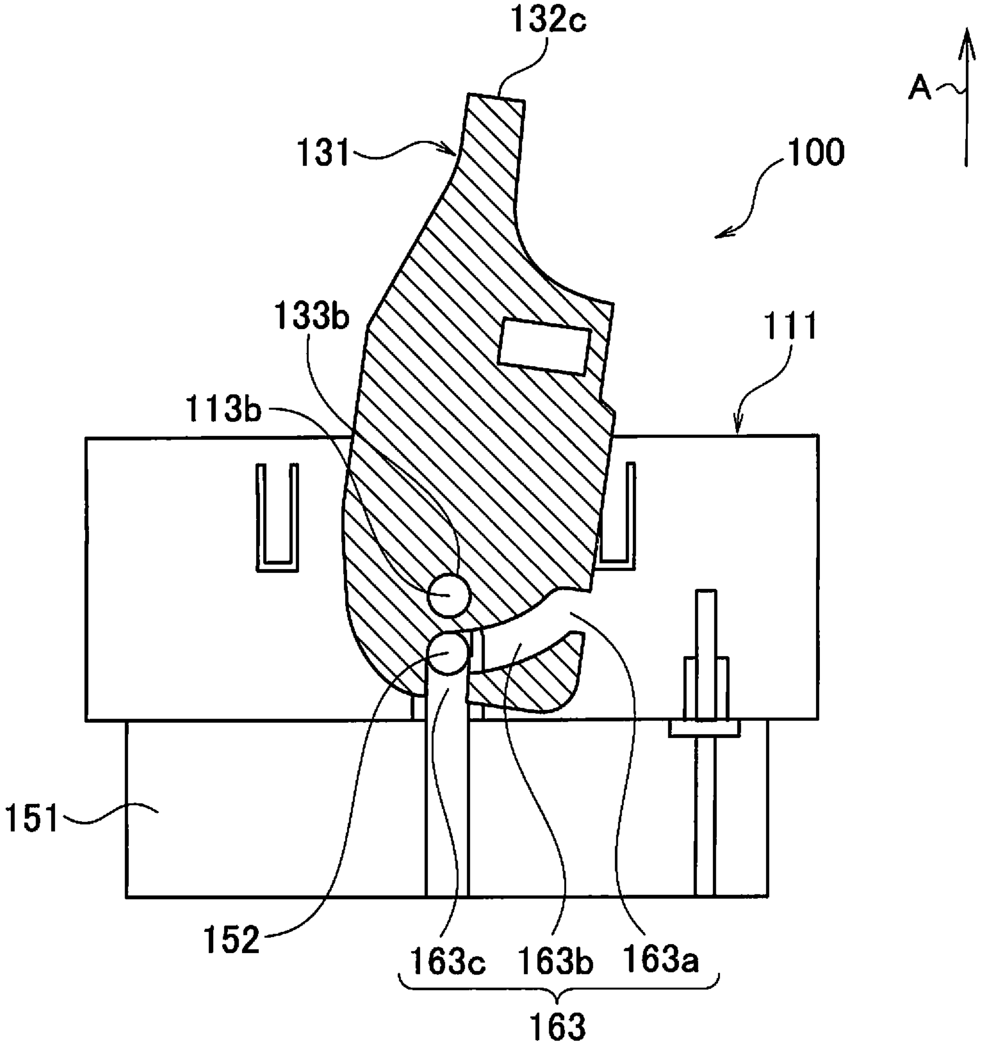
FIG. 5 is a sectional view illustrating the fitting work of the auxiliary fitting jig predicated on the auxiliary fitting jig of the present invention.

The fitting work of the auxiliary fitting jig 100 in FIGS. 1 and 2 will be described with reference to FIGS. 3 to 5. FIGS. 3 to 5 are sectional views illustrating the fitting work of the auxiliary fitting jig 100 in FIGS. 1 and 2.

As illustrated in FIG. 3, first, the auxiliary fitting jig 100 accommodating the female connector 141 (see FIG. 2B) in the connector accommodation chamber 110 is inserted into the male connector 151.

When the auxiliary fitting jig 100 is inserted into the male connector 151, the male connector engagement portions 163 (one side omitted) of the lever 131 are engaged with the pair of male connector projections 152 (see FIG. 2C, one side omitted).

After the auxiliary fitting jig 100 being inserted into the male connector 151 (before the lever is rotated in the direction of an arrow A), the one side 163*a* of the male connector engagement portion 163 (one side omitted) is engaged with the male connector projection 152 (see FIG. 2C, one side omitted).

Next, as illustrated in FIG. 4, when the lever body connecting portion 132*c* of the lever 131 upward (direction of the arrow A in FIG. 3) is rotated, the intermediate portion 163*b* of the male connector engagement portion 163 (one side omitted) is engaged with the male connector projection 152 (see FIG. 2C, one side omitted) in a state (state of the lever illustrated in FIG. 4) in which the lever is rotated halfway.

Thus, with movement of the location of the male connector engagement portion 163 to be engaged with the male connector projection 152 from the one side 163*a* to the intermediate portion 163*b*, the distance between the jig assembly holes 133*a*, 133*b* as the rotation center of the lever 131 and the male connector projection 152 becomes shorter.

Then, the interval between the lever mounting bosses 113*a*, 113*b* of the jig body 111 accommodating the female connector 141 in accordance with the rotation angle of the lever 131 and the male connector projection 152 becomes narrower. Accordingly, the male connector 151 moves to the side of the female connector 141 (see FIG. 2B).

Then, as illustrated in FIG. 5, the other side 163*c* of the male connector engagement portion 163 (one side omitted) is engaged with the male connector projection 152 (see FIG. 2C, one side omitted) in a state (state of the lever illustrated in FIG. 5) in which the lever 131 is fully rotated so that the male connector 151 fits into the female connector 141 (see FIG. 2B).

In addition, when the lever 131 is fully rotated (state of the lever illustrated in FIG. 5) to fit the male connector 151 into the female connector 141, the other side 163*c* of the male connector engagement portion 163 is positioned linearly upward (direction of the arrow A in FIG. 3).

Thus, the male connector 151 fitted into the female connector 141 can easily be removed by moving the lever 131 and the jig body 111 upward (direction of the arrow A in FIG. 5).

In this manner, the lever 131 and the jig body 111 can be removed from the female connector 141 after the male connector 151 (see FIG. 2B) being fitted into the female connector 141 in the auxiliary fitting jig 100 and therefore, the male connector 151 can be fitted into a plurality of the female connectors 141 using the auxiliary fitting jig 100.

In the above auxiliary fitting jig 100, the first jig body 112*a* and the second jig body 112*b* are connected by the jig body connection portion 112*c* and the first lever body 132*a* and the second lever body 132*b* are connected by the lever body connecting portion 132*c*.

Therefore, the above auxiliary fitting jig 100 is an auxiliary fitting jig dedicated to the specific female connector 141 having a width (see a length C of one side illustrated in FIG. 2B) corresponding to the interval between the first jig body 112*a* and the second jig body 112*b*.

When dedicated auxiliary fitting jigs are used, it is necessary to select the auxiliary fitting jig by preparing many jigs corresponding to widths of female connectors to fit male connectors into a plurality of female connectors having different widths, making the fitting work complicated.

Thus, the auxiliary fitting jig 1 according to an embodiment of the present invention is provided with an interval adjustment mechanism in a jig body 11 and a lever 31 to enable male connectors to fit into female connectors whose one side has different lengths using one type of the auxiliary fitting jig 1.

Figure 6:
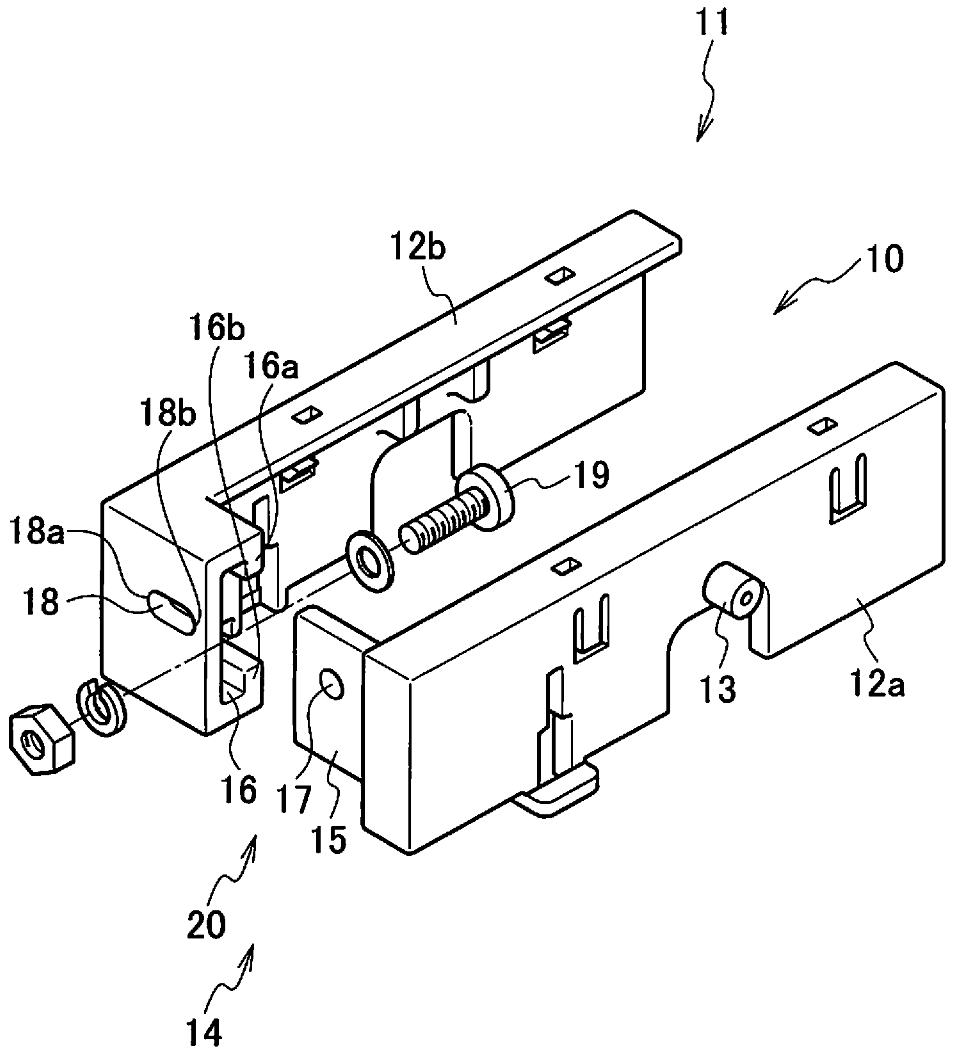
FIG. 6 is a perspective view showing a first interval adjustment mechanism of the auxiliary fitting jig according to an embodiment of the present invention.

Next, the configuration of the auxiliary fitting jig 1 according to an embodiment of the present invention will be described in detail with reference to FIGS. 6 to 8. FIG. 6 is a perspective view showing a first interval adjustment mechanism 14 of the auxiliary fitting jig 1 according to an embodiment of the present invention.

Figure 7:
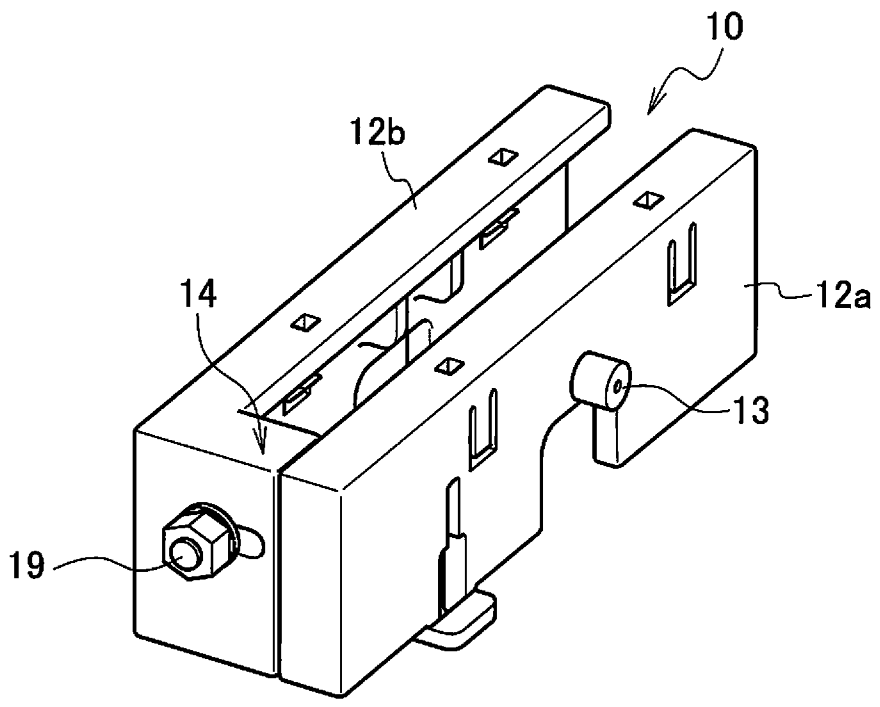
FIG. 7 is a perspective view showing a jig body according to the embodiment of the present invention.

FIG. 7 is a perspective view showing the jig body 11 according to the embodiment of the present invention. FIG. 8 is a perspective view showing the lever 31 and a second interval adjustment mechanism 34 of the auxiliary fitting jig 1 according to the embodiment of the present invention.

Like the auxiliary fitting jig 100 described above, the auxiliary fitting jig 1 according to an embodiment of the present invention is a jig that fits the male connector 151 into the female connector 141 by rotating the lever 31.

Figure 8:
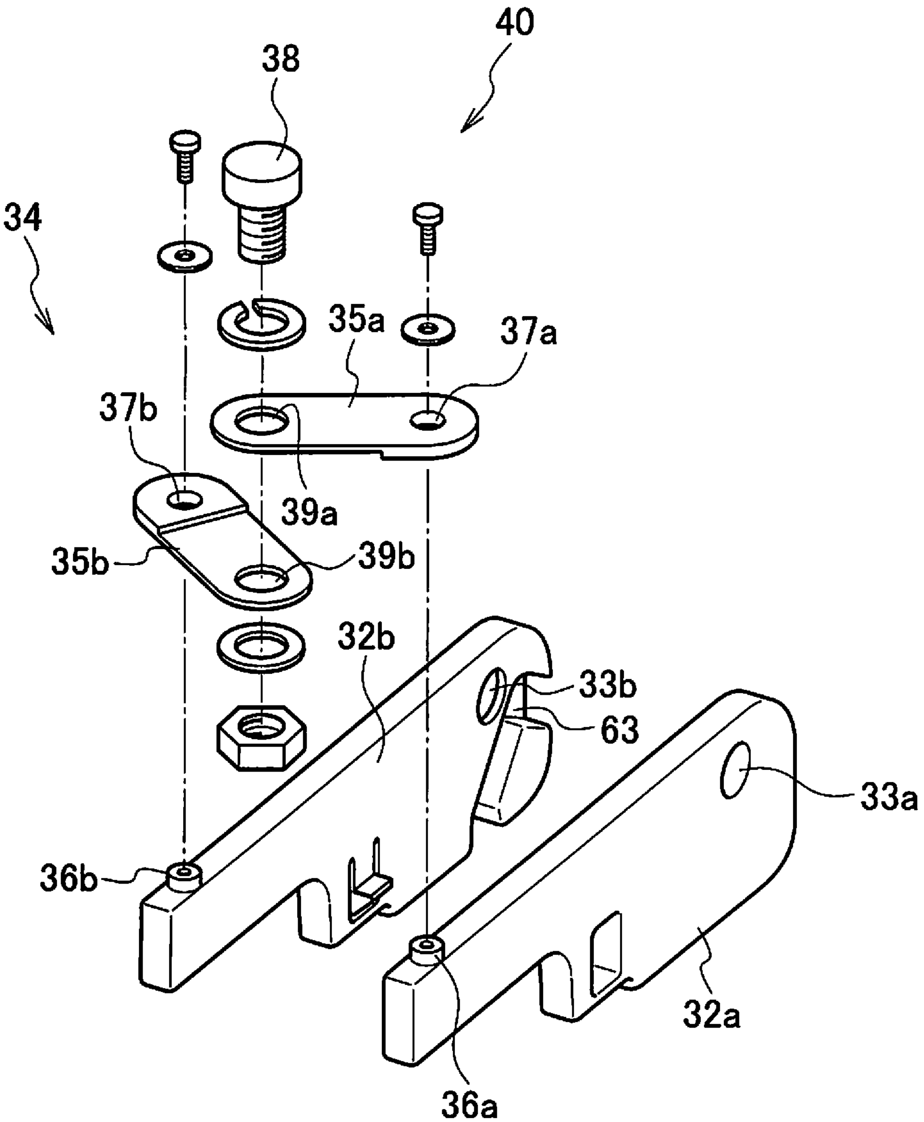
FIG. 8 is a perspective view showing the lever and a second interval adjustment mechanism of the auxiliary fitting jig according to the embodiment of the present invention.

As illustrated in FIGS. 6 to 8, the auxiliary fitting jig 1 (see FIGS. 9 and 10 described later) according to the embodiment of the present invention is substantially configured by the jig body 11 including a connector accommodation chamber 10 accommodating the female connector 141 (see FIG. 2B) and the lever 31 pivotally supported by the jig body 11 so as to be rotatable.

As illustrated in FIGS. 6 and 7, the jig body 11 includes a first jig body 12*a* and a second jig body 12*b* that hold the female connector 141 (see FIG. 2B) from both sides and a first interval adjustment mechanism 14 that interval-adjustably connects the first jig body 12*a* and the second jig body 12*b*.

The first jig body 12*a* and the second jig body 12*b* are provided with a pair of lever mounting bosses 13 (one side omitted) that pivotally supports the lever 31 so as to be rotatable by being inserted into jig assembly holes 33*a*, 33*b* (see FIG. 8 described later), respectively.

The first interval adjustment mechanism 14 is provided between the first jig body 12*a* and the second jig body 12*b* and includes a first positioning mechanism 20 for positioning with respect to the first jig body 12*a* and the second jig body 12*b*.

The first positioning mechanism 20 includes a slide plate 15 projected from the first jig body 12*a* and a slide groove 16 formed in the second jig body 12*b* to enable the slide plate 15 to slide.

The slide plate 15 and the slide groove 16 extend along an interval direction of the first jig body 12*a* and the second jig body 12*b*. The slide groove 16 has holding plates 16*a*, 16*b* to hold the slide plate 15 by being extended from one side and the other side formed therein.

The first positioning mechanism is configured by a first slide adjustment hole 17 formed in the slide plate 15, a second slide adjustment hole 18 formed in the slide groove 16, and a jig slide adjustment screw 19 to hold the interval between the first jig body 12*a* and the second jig body 12*b* by being inserted into the first slide adjustment hole 17 and the second slide adjustment hole at any interval.

The first slide adjustment hole 17 is formed in a circular shape having substantially the same diameter as the diameter of an axis of the jig slide adjustment screw 19 and the second slide adjustment hole 18 is formed is formed in an elliptic shape extending from one end 18*a* to another end 18*b*.

Thus, by inserting the jig slide adjustment screw 19 in any position between the one end 18*a* and the other end 18*b* and tightening the screw, the interval between the first jig body 12*a* and the second jig body 12*b* can be held at any interval by the slide plate 15 being supported by the slide groove 16.

By loosening the jig slide adjustment screw 19 inserted into the slide groove 16, the jig slide adjustment screw 19 can be slid between the one end 18*a* and the other end 18*b* while supporting the slide plate 15.

That is, when the jig slide adjustment screw 19 is positioned at the one end 18*a*, the end face of the holding plates 16*a*, 16*b* is in contact with the first jig body 12*a* and the interval between the first jig body 12*a* and the second jig body 12*b* becomes the minimum interval (see FIG. 7).

When the position of the jig slide adjustment screw 19 is shifted to the other end 18*b*, the interval between the one end 18*a* and the other end 18*b* becomes wider compared with a case when the jig slide adjustment screw 19 is positioned at the one end 18*a*.

As illustrated in FIG. 8, the lever 31 includes a first lever body 32*a* pivotally supported by the first jig body 12*a* so as to be rotatable and a second lever body 32*b* pivotally supported by the second jig body 12*b* so as to be rotatable.

The lever 31 includes a second interval adjustment mechanism 34 that interval-adjustably connects the first lever body 32*a* and the second lever body 32*b* in accordance with the interval between the first jig body 12*a* and the second jig body 12*b* adjusted by the first interval adjustment mechanism 14 (see FIGS. 6 and 7).

As illustrated in FIG. 8, the first lever body 32*a* and the second lever body 32*b* have a pair of the jig assembly holes 33*a*, 33*b* into which the pair of lever mounting bosses 13 (one side omitted) is inserted respectively formed therein.

In the first lever body 32*a* and the second lever body 32*b*, as illustrated in FIG. 8, a pair of male connector engagement portions 63 (one side omitted) engaged with the pair of male connector projections 152 (see FIG. 2C, one side omitted) projected to the outside of the male connector 151 is formed.

Figure 9:
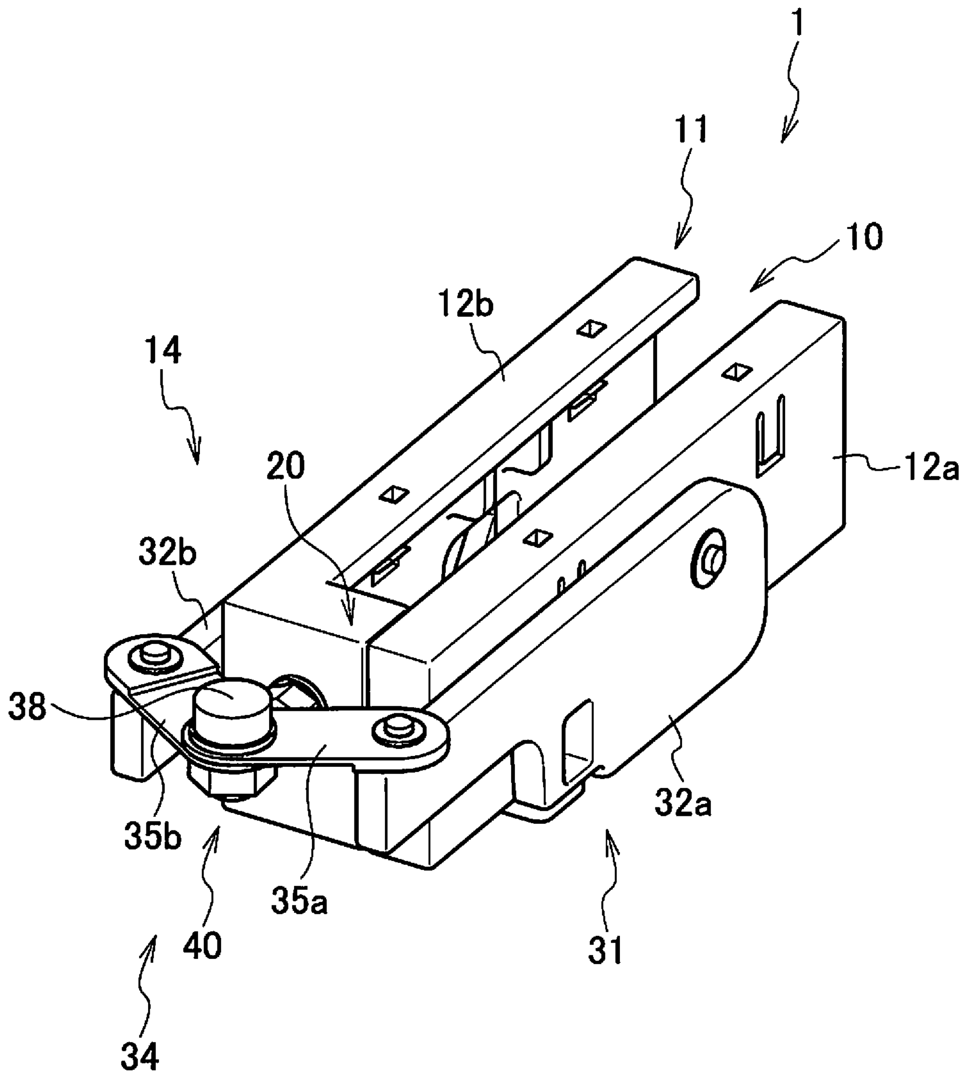
FIG. 9 is a perspective view showing a minimum interval between the jig body and the lever according to the embodiment of the present invention.
Figure 10:
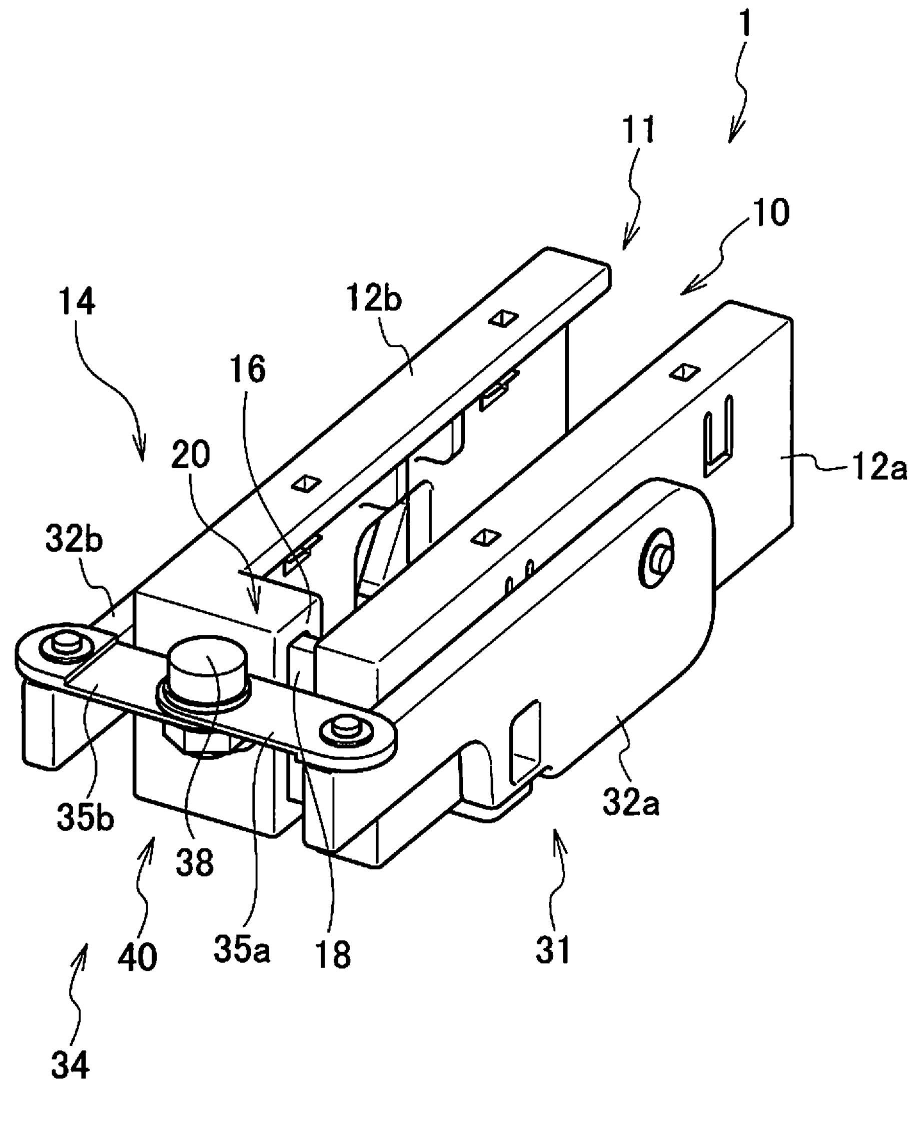
FIG. 10 is a perspective view showing a maximum interval between the jig body and the lever according to the embodiment of the present invention.

As illustrated in FIGS. 9 and 10 later, the lever 31 is pivotally supported by the jig body 11 to be rotatable by the jig assembly holes 33*a*, 33*b* being inserted into the respective lever mounting bosses 13 (see FIGS. 6 and 7, one side omitted).

The second interval adjustment mechanism 34 is provided in a position where interference with the jig body 11 can be avoided throughout the rotation range (see FIGS. 3 to 5) of the lever 31 relative to the jig body 11 (see FIGS. 6 and 7). The second interval adjustment mechanism 34 is provided between the first lever body 32*a* and the second lever body 32*b*.

As described above, because the second interval adjustment mechanism 34 is provided in a position where interference with the jig body 11 can be avoided, the male connector 151 (see FIG. 2C) can be fitted into the female connector 141 (see FIG. 2B) by holding the second interval adjustment mechanism 34 to rotate the lever 31.

The second interval adjustment mechanism 34 is provided between the first lever body 32*a* and the second lever body 32*b* and includes a second positioning mechanism 40 for positioning with respect to the first lever body 32*a* and the second lever body 32*b*.

The second interval adjustment mechanism 34 includes a pair of lever movable plates 35*a*, 35*b* and lever movable plate mounting bosses 36*a*, 36*b* provided on the first lever body 32*a* and the second lever body 32*b* and on which the lever movable plates 35*a*, 35*b* are mounted by a screw respectively.

The pair of lever movable plates 35*a*, 35*b* of the second interval adjustment mechanism 34 has boss holes 37*a*, 37*b* through which the lever movable plate mounting bosses 36*a*, 36*b* are inserted and connecting holes 39*a*, 39*b* through which movable connecting screws 38 are inserted formed therein.

The pair of lever movable plates 35*a*, 35*b* is supported by the first lever body 32*a* and the second lever body 32*b* by the lever movable plate mounting bosses 36*a*, 36*b* being inserted through the boss holes 37*a*, 37*b* and the lever movable plate mounting bosses 36*a*, 36*b* and the boss holes 37*a*, 37*b* being screwed.

The pair of lever movable plates 35*a*, 35*b* is mounted between the first lever body 32*a* and the second lever body 32*b* by the movable connecting screws 38 being inserted through the connecting holes 39*a*, 39*b* and tightened.

Then, the pair of lever movable plates 35*a*, 35*b* is extended or bent in accordance with an increase/decrease of the interval between the first lever body 32*a* and the second lever body 32*b* (see FIGS. 9 and 10).

That is, if the pair of lever movable plates 35*a*, 35*b* is in a bent state (the lever movable plates 35*a*, 35*b* are at an obtuse angle with respect to the first lever body 32*a* and the second lever body 32*b* respectively), the interval between the first lever body 32*a* and the second lever body 32*b* is the minimum interval by the first lever body 32*a* and the second lever body 32*b* being brought into contact with the first jig body 12*a* and the second jig body 12*b* separated by the minimum interval.

On the other hand, if the pair of lever movable plates 35*a*, 35*b* is in an extended state (the lever movable plates 35*a*, 35*b* are at right angles to the first lever body 32*a* or the second lever body 32*b*), the interval between the first lever body 32*a* and the second lever body 32*b* is the maximum interval.

Therefore, the interval between the first jig body 12*a* and the second jig body 12*b* can be increased until the first jig body 12*a* and the second jig body 12*b* come into contact with the first lever body 32*a* and the second lever body 32*b* separated by the maximum interval respectively.

The pair of lever movable plates 35*a*, 35*b* configured as described above is extended or bent from the extended state to the bent state steplessly following an increase/decrease of the interval between the first jig body 12*a* and the second jig body 12*b* (see FIGS. 9 and 10).

The auxiliary fitting jig 1 in which the lever 31 is mounted on the jig body 11 accommodates the female connector 141 (see FIG. 2B) in the connector accommodation chamber 10 before inserting the female connector 141 into the male connector 151 (see FIG. 2C). Then, the male connector 151 is fitted into the female connector 141 by rotating the lever 31.

In this manner, the jig body 11 holds the female connector 141 (see FIG. 2B) from both sides by the first jig body 12*a* and the second jig body 12*b* and thus, after the male connector 151 being fitted into the female connector 141, the auxiliary fitting jig can be removed from the female connector 141 and used to fit the other female and male connectors 141, 151.

The jig body 11 includes the first interval adjustment mechanism 14 that interval-adjustably connects the first jig body 12*a* and the second jig body 12*b* and thus can hold female connectors having different widths from both sides.

Further, the lever 31 includes the second interval adjustment mechanism 34 that interval-adjustably connects the first lever body 32*a* and the second lever body 32*b* in accordance with the interval between the first jig body 12*a* and the second jig body 12*b* and thus, can fit the female and male connectors 141, 151 having different widths.

Therefore, the auxiliary fitting jig 1 of greater versatility capable of fitting connectors of different widths by one auxiliary fitting jig can be provided.

Next, the first positioning mechanism 20 and the second positioning mechanism 40 of the auxiliary fitting jig 1 according to the embodiment of the present invention will be described in detail with reference to FIGS. 9 and 10. FIG. 9 is a perspective view showing the minimum interval between the jig body 1 and the lever 31 according to the embodiment of the present invention. FIG. 10 is a perspective view showing the maximum interval between the jig body 11 and the lever 31 according to the embodiment of the present invention.

As illustrated in FIG. 9, the first positioning mechanism 20 positions the first jig body 12*a* relative to the second jig body 12*b* when the jig body 11 and the lever 31 are separated by the minimum interval.

That is, with the jig slide adjustment screw 19 being positioned at the one end 18*a*, the holding plates 16*a*, 16*b* are in contact with the first jig body 12*a* (see FIG. 6) and the interval between the first jig body 12*a* and the second jig body 12*b* and the interval between the first lever body 32*a* and the second lever body 32*ba* are the minimum intervals. In this case, the lever 31 follows the jig body 11 and the pair of lever movable plates 35*a*, 35*b* is in a bent state.

Therefore, with the jig slide adjustment screw 19 being positioned at the one end 18*a*, the first positioning mechanism 20 positions the first jig body 12*a* relative to the second jig body 12*b* when the jig body 11 and the lever 31 are separated by the minimum interval.

As illustrated in FIG. 10, the second positioning mechanism 40 positions the first lever body 32*a* relative to the second lever body 32*b* when the jig body 11 and the lever 31 are separated by the maximum interval.

That is, when the pair of lever movable plates 35*a*, 35*b* is in an extended state, the interval between the first lever body 32*a* and the second lever body 32*b* becomes the maximum interval. In this case, the jig body 11 follows the lever 31 and the jig slide adjustment screw 19 is positioned anywhere (for example, positioned near the other end 18*b*) other than the one end 18*a* while supporting the slide plate 15.

Thus, with the pair of lever movable plates 35*a*, 35*b* being extended, the second positioning mechanism 40 positions the first lever body 32*a* relative to the second lever body 32*b* when the jig body 11 and the lever 31 are separated by the maximum interval.

With the first positioning mechanism 20 and the second positioning mechanism 40, the slide groove 16 can slidably support the slide plate 15 in the entire range (range between the minimum interval illustrated in FIG. 9 and the maximum interval illustrated in FIG. 10) of the interval adjustment range between the first jig body 12*a* and the second jig body 12*b*.

The pair of lever movable plates 35*a*, 35*b* can be extended or bent in the entire range (range between the minimum interval illustrated in FIG. 9 and the maximum interval illustrated in FIG. 10) of the interval adjustment range between the first lever body 32*a* relative to the second lever body 32*b*.

As described above, the first interval adjustment mechanism 14 includes the first positioning mechanism 20 that positions the first jig body 12*a* relative to the second jig body 12*b* and the second interval adjustment mechanism 34 includes the second positioning mechanism 40 that positions the first lever body 32*a* relative to the second lever body 32*b*. Therefore, the configuration of each positioning mechanism can be made simpler compared with a case in which the configurations for positioning when the interval is at the maximum and at the minimum are together provided in one of the jig body 11 and the lever 31.

If the width of the jig body 11 is adjusted by using the first positioning mechanism 20 and the second positioning mechanism 40, the width is adjusted by the jig body 11 being followed by the lever 31. If the width of the lever 31 is adjusted, the width is adjusted by the lever 31 being followed by the jig body 11 and therefore, width adjustments can easily be made for the width of the female connector 141 and the female connector 141 (see FIG. 2B) can be accommodated in the connector accommodation chamber 10.

As described above, the auxiliary fitting jig 1 according to an embodiment of the present invention is the auxiliary fitting jig 1 used to fit the male connector 151 into the female connector 141 by rotating the lever 31 and includes the jig body 11 having the first jig body 12*a* and the second jig body 12*b* that hold the female connector 141 from both sides and the first interval adjustment mechanism 14 that interval-adjustably connects the first jig body 12*a* and the second jig body 12*b*, wherein the lever 31 includes the first lever body 32*a* pivotally supported by the first jig body 12*a* so as to be rotatable, the second lever body 32*b* pivotally supported by the second jig body 12*b* so as to be rotatable, and the second interval adjustment mechanism 34 that interval-adjustably connects the first lever body 32*a* and the second lever body 32*b* in accordance with the interval between the first jig body 12*a* and the second jig body 12*b* adjusted by the first interval adjustment mechanism 14.

In the auxiliary fitting jig 1 according to an embodiment of the present invention, the second interval adjustment mechanism 34 is provided in a position where interference with the jig body 11 can be avoided throughout the rotation range of the lever 31 with respect to the jig body 11.

In the auxiliary fitting jig 1 according to an embodiment of the present invention, the first interval adjustment mechanism 14 includes the first positioning mechanism 20 that positions the first jig body 12*a* relative to the second jig body 12*b* by adopting one of the maximum interval and the minimum interval of the interval between the jig body 11 and the lever 31 and the second interval adjustment mechanism 34 includes the second positioning mechanism 40 that positions the first lever body 32*a* relative to the second lever body 32*b* by adopting the other of the maximum interval and the minimum interval of the interval between the jig body 11 and the lever 31.

According to the auxiliary fitting jig 1 in an embodiment of the present invention, the jig body 11 holds the female connector 141 from both sides by the first jig body 12*a* and the second jig body 12*b* and therefore, after the male connector 151 being fitted into the female connector 141, the auxiliary fitting jig can be removed from the female connector 141 for use to fit the other female and male connectors 141, 151.

The jig body 11 includes the first interval adjustment mechanism 14 that interval-adjustably connects the first jig body 12*a* and the second jig body 12*b* and so can hold female connectors of different widths from both sides.

The lever 31 includes the second interval adjustment mechanism 34 that interval-adjustably connects the first lever body 32*a* and the second lever body 32*b* in accordance with the interval between the first jig body 12*a* and the second jig body 12*b* and so can fit the other female and male connectors 141, 151.

Therefore, the auxiliary fitting jig 1 of greater versatility capable of fitting connectors of different widths by one auxiliary fitting jig can be provided.

According to the auxiliary fitting jig 1 in an embodiment of the present invention, the second interval adjustment mechanism 34 is provided in a position where interference with the jig body 11 can be avoided and therefore, the male connector 151 can be fitted into the female connector 141 by holding the second interval adjustment mechanism 34 to rotate the lever 31.

According to the auxiliary fitting jig 1 in an embodiment of the present invention, the first interval adjustment mechanism 14 includes the first positioning mechanism 20 that positions the first jig body 12*a* relative to the second jig body 12*b* and the second interval adjustment mechanism 34 includes the second positioning mechanism 40 that positions the first lever body 32*a* relative to the second lever body 32*b*. Therefore, the configuration of each positioning mechanism can be made simpler compared with a case in which the configurations for positioning when the interval is at the maximum and at the minimum are together provided in one of the jig body 11 and the lever 31.

In the foregoing, an auxiliary fitting jig according to the present invention has been described based on the illustrated embodiment, but the present invention is not limited to the above example and the configuration of each unit can be replaced by any configuration having a similar function.

For example, a case in which the first positioning mechanism 20 of the auxiliary fitting jig 1 according to an embodiment of the present invention positions the first jig body 12*a* relative to the second jig body 12*b* when the jig body 11 and the lever 31 are separated by the minimum interval has been described, but the first jig body 12*a* may be positioned when the jig body 11 and the lever 31 are separated by the maximum interval.

A case in which the second positioning mechanism 40 of the auxiliary fitting jig 1 according to the present invention positions the first lever body 32*a* relative to the second lever body 32*b* when the jig body 11 and the lever 31 are separated by the maximum interval has been described, but the first lever body 32*a* may be positioned when the jig body 11 and the lever 31 are separated by the minimum interval.

What is claimed is:

1. An auxiliary fitting jig used to fit one connector with another connector, the auxiliary fitting jig comprising:

a jig body including a first jig body and a second jig body configured to hold the one connector from both sides of the one connector, and a first interval adjustment mechanism configured to interval-adjustably connect the first jig body and the second jig body; and a lever including a first lever body pivotally supported by the first jig body, a second lever body pivotally supported by the second jig body, and a second interval adjustment mechanism configured to interval-adjustably connect the first lever body and the second lever body in accordance with an interval between the first jig body and the second jig body adjusted by the first interval adjustment mechanism, wherein the one connector and the another connector are configured to be fitted by rotation of the lever.

2. The auxiliary fitting jig according to claim 1, wherein the second interval adjustment mechanism is provided in a position where interference by the second interval adjustment mechanism with the jig body is avoided throughout a rotation range of the lever with respect to the jig body.

3. The auxiliary fitting jig according to claim 2, wherein the first interval adjustment mechanism includes a first positioning mechanism configured to position the first jig body relative to the second jig body with an interval between the jig body and the lever being a maximum interval or a minimum interval, and wherein the second interval adjustment mechanism includes a second positioning mechanism configured to position the first lever body relative to the second lever body with the interval between the jig body and the lever being the maximum interval or the minimum interval.

4. The auxiliary fitting jig according to claim 1, wherein the first interval adjustment mechanism includes a first positioning mechanism configured to position the first jig body relative to the second jig body with an interval between the jig body and the lever being a maximum interval or a minimum interval, and wherein the second interval adjustment mechanism includes a second positioning mechanism configured to position the first lever body relative to the second lever body with the interval between the jig body and the lever being the maximum interval or the minimum interval.

* * * * *